Dec. 31, 1957   H. J. BLASKOWSKI ET AL   2,818,049
METHOD OF HEATING
Filed Aug. 5, 1954   2 Sheets-Sheet 1

HENRY J. BLASKOWSKI
ARTHUR T. HUNTER
JOHN H. CRUISE
INVENTORS

BY
Eldon H. Luther
ATTORNEY

Dec. 31, 1957  H. J. BLASKOWSKI ET AL  2,818,049
METHOD OF HEATING

Filed Aug. 5, 1954  2 Sheets-Sheet 2

HENRY J. BLASKOWSKI
ARTHUR T. HUNTER
JOHN H. CRUISE
INVENTORs

BY
*Eldon H. Luther*
ATTORNEY

United States Patent Office 2,818,049
Patented Dec. 31, 1957

2,818,049

METHOD OF HEATING

Henry J. Blaskowski and Arthur T. Hunter, New York, N. Y., and John H. Cruise, Linden, N. J., assignors to Combustion Engineering, Inc., New York, N. Y., a corporation of Delaware Application August 5, 1954, Serial No. 448,048

24 Claims. (Cl. 122—476)

This invention relates to fluidized bed operation and particularly to an improved method of utilizing a fluidized bed for the efficient transfer of heat generated by a burning fuel to a desired material, such as a fluid, and for generating, superheating and/or reheating a vapor and independently controlling the generation of the vapor and the superheating and/or reheating of the vapor.

The technique of fluidization involves keeping a mass of discrete material in a pseudo-liquid state by passing a gaseous medium through the mass in such a manner that the material is agitated to and maintained in a condition resembling a boiling liquid having what may be termed a pseudo-liquid level which establishes a definite division between the fluidized mass or bed and the gaseous space above the bed and whereat the entraining gases or a substantial portion thereof leave the fluidized bed and pass into said gaseous space.

It is well known that these fluidized beds have excellent heat transfer characteristics both between the entraining gas and the material of the bed and between this material and heat exchange coils and the like positioned in the bed.

It is an object of the present invention to utilize these characteristics in a highly efficient and expeditious manner to transfer heat generated by a burning fuel to a desired liquid, to vaporize the liquid and superheat and/or reheat the thus produced vapor and to independently control the vaporizing, superheating and/or reheating process, with these objectives being realized by the novel method explained in detail hereinafter. For clarity and ease of explanation reference is made to the accompanying drawing wherein.

Figure 1:
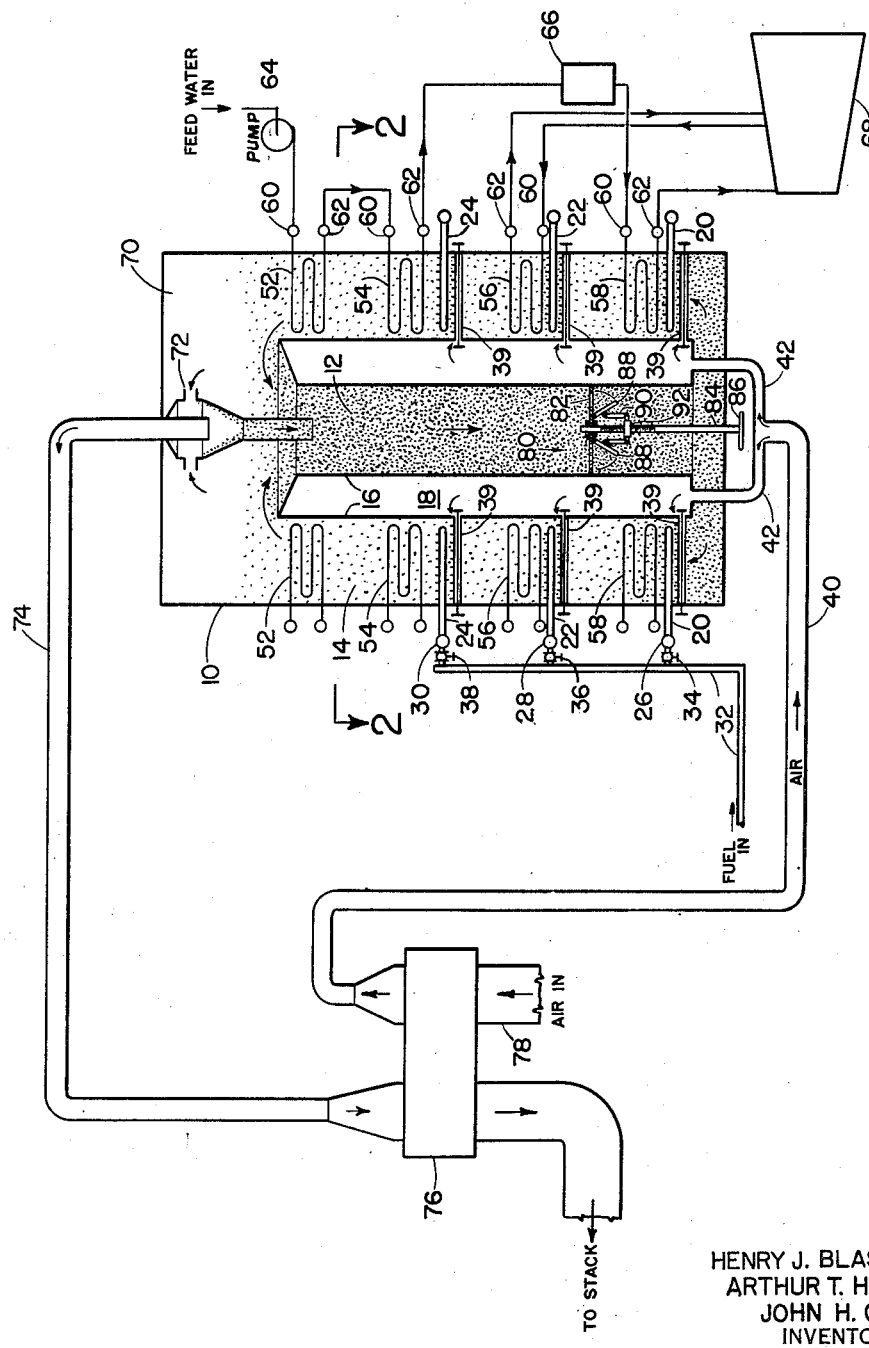
Figure 1 is a diagrammatic representation of a power plant installation utilizing the method of this invention.
Figure 2:
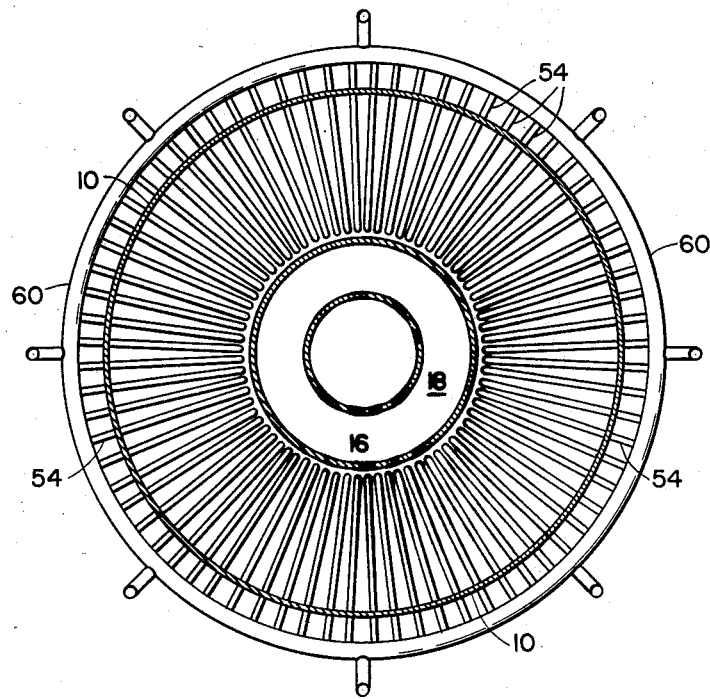
Figure 2 is a sectional view taken on line 2—2 of Fig. 1.

Referring now to the drawing the power plant depicted therein includes a steam generator having a cylindrical housing 10 divided into a central zone 12 and an annular zone 14 by coaxial cylindrical member 16 which itself forms an annular coaxial chamber 18. Zones 12 and 14 are in communication with each other at their adjacent upper and lower ends and a fluidized pseudo-liquid bed of discrete material is continuously circulated through the thus formed circuit moving downward through zone 12 and upward through zone 14.

This material is maintained in a fluidized pseudo-liquid state by introducing and burning fuel directly in the fluidized bed and passing the combustion gases therethrough with the fuel being introduced in a manner so that the entraining combustion gases produce a bed density in zone 14 which is considerably less than the bed density in zone 12. To this end fuel is introduced in the upwardly moving column of zone 14 at three vertically spaced locations by burners 20, 22 and 24 which extend radially inward from ring distributors 26, 28 and 30, respectively, with these distributors receiving a suitable fuel from supply conduit 32. In the connection of the distributors with the supply conduit valves 34, 36 and 38 are provided to individually control the introduction of fuel at each of the burner locations.

Figure 3:
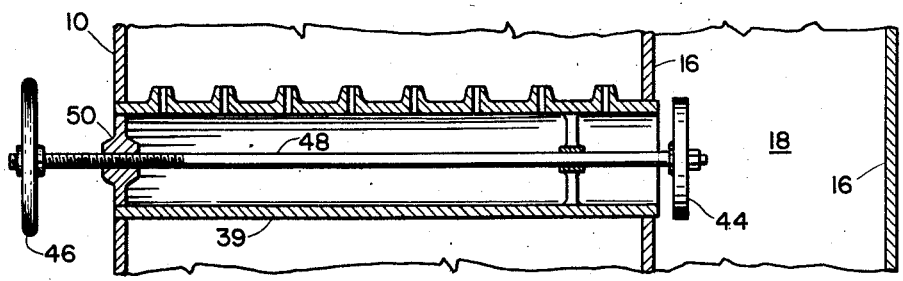
Figure 3 is a detail view of a portion of the organization of Fig. 1.

Combustion supporting air is introduced into the moving bed in a manner to effectively support the burning of the fuel introduced at the spaced burner locations and for this purpose air distribution conduits 39 extend radially outward from chamber 18 through annular zone 14 at locations immediately below the burner locations. Air is supplied under pressure to chamber 18 from conduit 40 and connecting ducts 42 and flows from this chamber into the various radial distribution conduits 39 and upwardly through the openings provided in the upper portion of these conduits and into the upwardly moving fluidized column in zone 14. Each of the distribution conduits 39 (Fig. 3) is provided with a valve 44 at its inlet with the valve being actuated by handle 46 located outwardly of housing 10 and attached to stem 48 threadedly received in member 50 and extending outwardly from the valve. These valves enable the air introduced at the several spaced locations to be individually controlled as well as the fuel mentioned hereinbefore.

The heat transferred to the fluidized medium by the burning fuel is utilized for the generation and heating of steam and in the illustrative organization economizer 52 is positioned in the fluidized bed adjacent the upper end of zone 14 while evaporator 54, reheater 56 and superheater 58 are positioned in the bed in zone 14 at locations immediately above the locations of burners 24, 22 and 20 respectively. Each of these heat exchange devices comprises numerous radially disposed sinuously bent tubes projecting into annular zone 14 and having their inlets connected to ring type inlet headers 60 and their outlets connected to ring type outlet headers 62.

Relatively cold feed water is supplied to economizer 52 from supply conduit 64 and in passing through the economizer the temperature of the water is raised to slightly below saturation temperature. From the economizer the water is conveyed through evaporator 54 where at least a portion thereof is converted to steam. Any water remaining unevaporated is separated from the steam in separator 66 with the steam then being conveyed through superheater 58 where it is superheated to a desired temperature and then conveyed to the high pressure stage of turbine 68. From an intermediate stage of the turbine the steam is conveyed through reheater 56 where it is reheated to a desired temperature and then reintroduced into the turbine.

It is important that the heat absorption in the economizer and evaporator be controlled so as to meet the load imposed upon the steam generator and the heat absorption of the superheater and that of the reheater be controlled so as to maintain the temperature of the superheated and reheated steam, respectively, substantially constant.

This is accomplished by individually regulating the rate of introduction of fuel into zone 14 through the burners 20, 22 and 24 with the regulation of burners 24 controlling the rate of steam generation while the regulation of burners 20 and 22 control the superheat and reheat steam temperatures respectively. Along with the regulation of each of the burners the air discharged through the group of distributor conduits 39 adjacent the respective burner location may also be controlled so that the air supplied is not substantially in excess of that required for complete combustion of the fuel thereby reducing the air consumption and accordingly the power required to supply the air.

The combustion gases generated by the burning fuel pass upwardly through zone 14 and maintain the discrete material moving upwardly therethrough in a fluidized pseudo-liquid state. At the upper end of zone 14 a substantial portion of these entraining combustion gases leave the fluidized bed, i. e., at the pseudo-liquid level of the bed, and pass through the gas space 70 above the bed and into separator 72 which is effective to separate the very slight amount of material carried from the fluidized bed by these entraining gases and return this separated material to the bed with the gases passing out through the top of the separator. A portion of the entraining combustion gases do not leave the bed at the upper end of zone 14 however, but remain entrained with the material and pass downwardly through zone 12 with the material thereby maintaining the mass in this zone in a fluidized condition.

By generating the entraining gases for fluidization in the upwardly moving column of zones 14 and releasing a portion of these gases at the upper end of this zone the density of the upwardly moving column will be substantially less than that of the downwardly moving column thereby causing a rapid gravity circulation of the bed.

The combustion gases passing upwardly and out of separator 72 are conveyed through duct 74 to air heater 76, through the airheater and then to a suitable stack. Cold air is supplied to air heater 76 under pressure through duct 78 and in passing through the airheater a portion of the heat in the combustion gases is transferred to this air with the hot air leaving the airheater being conveyed to the boiler through conduit 40.

The fluidized bed is circulated at such a rate and the heat transfer relationship between the heat exchange devices and the bed is such that the temperature of the bed and accordingly the entraining combustion gases is substantially decreased upon traversal of each of the heat exchange devices, i. e., the superheater, reheater, evaporator and economizer. As the bed traverses the zone of burner 20 and superheater 58 a regulated amount of heat (determined by the rate of firing of burner 20) is imparted to the bed so that the heat absorbed by the superheater will be such as to give the desired superheat temperature; as the bed traverses the zone of burner 22 and reheater 56 a further regulated amount of heat is imparted to the bed so the heat absorbed by the reheater will be such as to give the desired reheat temperature; and as the bed traverses the zone of burner 24 and evaporator 54 a still further regulated amount of heat is imparted to the bed so the heat absorbed by the evaporator and the economizer will be such as to maintain the desired steam production. While the bed temperature at each of the burner zones is high this temperature is lowered after traversal of the heat exchanger downstream of the zone relative to bed movement with the bed temperature immediately downstream of economizer 52 being quite low, as for example, between 600 and 700° F. Since the temperature of the gases leaving the bed is already quite low and since additional heat is extracted from the gases leaving the bed upon their passage through air heater 76, and other heating exchange devices if desired, a high operating efficiency is achieved.

Since the amount of heat exchange surface making up each of the heat exchange devices must be designed for a predetermined rate of circulation of the bed and since this rate of circulation will change with the firing rate of the burners, which firing rate is different for different loads imposed on the steam generator, it is necessary to controllably regulate this rate of circulation in some way in order to maintain the aforementioned efficient operation of the unit wherein the bed temperature immediately downstream of economizer 52 and accordingly that immediately upstream of burner 20 will be quite low, as the aforementioned example of 600 to 700° F. This control is accomplished in the illustrative organization by valve means 80 disposed in the downflow zone 12 with this valve means comprising perforate support or spider 82 fixedly secured within zone 12 of cylindrical member 16 and having the upper end of actuating rod 84 extending through a central opening provided therein. Collars are secured to this end of rod 84 on each side of spider 82 permitting the rod to rotate rotatively to the spider but preventing relative axial movement between the rod and the spider. Rod 84 extends through the lower end of housing 10 and is provided at its lower end with handwheel 86. A pair of generally semicircular valve members 88 are secured to spider 82 and pivotally mounted above parallel horizontal axes. Pivotal movement of these valve members is accomplished by means of linkage 90 connected to collar 92 which is threadedly received on rod 84. As the rod is rotated by handwheel 86 collar 92 moves up or down depending upon the direction of rotation of the rod causing the pivotal valve members to move toward their closed or open position respectively. Thus valve means 80 acts as an adjustable restriction in zone 12 effectively controlling the rate of circulation of the bed with this valve being regulated to maintain said circulation rate at the value which results in the aforementioned efficient operation of the unit.

As mentioned hereinbefore the temeperature of the bed decreases upon traversal of each of the heat exchange devices and by way of example, in a high capacity steam generator of the type described, the bed temperature immediately upstream of the superheater may be 1375° F. while that immediately downstream of the superheater may be 790° F.; that immediately upstream of the reheater may be 1250° F. while that immediately downstream of the reheater may be 985° F.; and that immediately upstream of the evaporator may be 1680° F. while that immediately downstream of the economizer may be 680° F.

Since it is difficult to get complete combustion of the fuel within the bed with the use of a minimum of excess air the bed is composed of a material that is a highly active oxidizing catalyst thereby catalizing the combustion rendering it highly efficient and achieving complete combustion with the use of a minimum of excess air.

With the method of this invention, because of the aforementioned high heat transfer characteristics of a fluidized bed, the size of the equipment required to generate, superheat and/or reheat steam will be greatly reduced over that required by present conventional methods and the generation, superheating and/or reheating may be advantageously controlled as desired.

What we claim is:

1. The method of produing superheated vapor comprising supplying fuel to a zone containing a fluidized pseudo-liquid medium of an oxidizing catalyst, effecting combustion of said fuel in said zone, passing a liquid in indirect heat exchange relation with the fluidized medium at said zone thereby imparting heat to said liquid for converting it to its gaseous state, supplying fuel to a second zone containing a fluidized pseudo-liquid medium of an oxidizing catalyst, effecting combustion of this fuel in this zone, passing the gaseous fluid produced in said first zone in indirect heat exchange relation with the fluidized medium at said second zone thereby imparting heat to said fluid to superheat the same, passing the combustion gases generated in one of said zones through the other zone and independently regulating the rate of fuel supply at each of said zones in a manner to independently control the generation of vapor and the temperature of the superheated vapor.

2. The method defined in claim 1 wherein the combustion gases generated in the second zone are passed through the first zone.

3. The method of producing superheated vapor comprising supplying fuel to a zone containing a fluidized pseudo-liquid medium of an oxidizing catalyst, effecting combustion of said fuel in said zone, passing a liquid in indirect heat exchange relation with the fluidized medium at said zone thereby imparting heat to said liquid for converting it to its gaseous stage, supplying fuel to a second zone containing a fluidized pseudo-liquid medium of an oxidizing catalyst, effecting combustion of this fuel in this zone, passing the gaseous fluid produced in said first zone in indirect heat exchange relation with the fluidized medium at said second zone thereby imparting heat to said fluid to superheat the same, supplying fuel to a third zone containing a fluidized pseudo-liquid medium of an oxidizing catalyst, effecting combustion of this fuel in this zone, passing said superheated gaseous fluid after it has given up a portion of its energy in indirect heat exchange relation with said third zone thereby imparting heat to said superheated gaseous fluid, directing the combustion gases traversing the fluidized medium in one of said zones through the fluidized medium in another of said zones, directing the combustion gases traversing the fluidized medium in said other zone through the fluidized medium in the last of the zones, and independently regulating the rate of fuel supply at each of said zones in a manner to independently control the generation of vapor and the temperature of the superheated and reheated vapor.

4. The method of producing superheated vapor comprising supplying fuel to a zone containing a fluidized pseudo-liquid medium of an oxidizing catalyst, effecting combustion of said fuel in said zone, passing a liquid in indirect heat exchange relation with the fluidized medium at said zone thereby imparting heat to said liquid for converting it to its gaseous state, supplying fuel to a second zone containing a fluidized pseudo-liquid medium of an oxidizing catalyst, effecting combustion of this fuel in this zone, passing the gaseous fluid produced in said first zone in indirect heat exchange relation with the fluidized medium at said second zone thereby imparting heat to said fluid to superheat the same, supplying fuel to a third zone containing a fluidized pseudo-liquid medium of an oxidizing catalyst, effecting combustion of this fuel in this zone, passing to said superheated gaseous fluid after it has given up a portion of its energy in indirect heat exchange relation with said third zone thereby imparting heat to said superheated gaseous fluid, directing the combustion gases traversing the fluidized meduim in said second zone through the fluidized medium in said third zone, directing the combustion gases traversing the fluidized medium in said third zone through the fluidized medium in said first zone, and independently regulating the rate of fuel supply at each of said zones in a manner to independently control the generation of vapor and the temperature of the superheated and reheated vapor.

5. The method of generating and superheating steam comprising serially passing a continuously circulating bed of fluidized pseudo-liquid discrete material which is an oxidizing catalyst over a superheater and an evaporator, injecting and burning fuel in said bed at locations immediately upstream of said superheater and evaporator, injecting a combustion supporting gas in said bed in a manner to effectively support said burning, introducing water into and generating steam in said evaporator and conveying the same to and superheating the same in said superheater, and independently regulating the rate of fuel injection at said locations in a manner to control the generation of steam to meet the steam demand and to maintain the superheated steam temperature substantially constant.

6. The method of transferring heat from a burning fluid involving the use of a fluidized pseudo-liquid bed of discrete material which is an oxidizing catalyst and is continuously circulated by gravity through a predetermined path which includes an upflow column and a downflow column, comprising the steps of maintaining said bed in a fluidized pseudo-liquid state and the density of the upflow column substantially lower than the density of the downflow column by generating combustion gases in the upflow column through the introduction and burning of fuel therein, flowing said gases upwardly through the upflow column, disengaging a portion of the gases from the upflow column at the upper end of said column, passing a fluid in indirect heat exchange relation with said bed at a location in the upflow column above the introduction and burning of fuel therein to impart heat thereto and maintaining the rate of circulation of the bed such that the temperature of the bed and accordingly of the entraining gases immediately downstream of said location is substantially less than that immediately upstream of said location.

7. The method of generating and superheating steam comprising continuously circulating a bed of discrete material which is an oxidizing catalyst through a predetermined path in a fluidized pseudo-liquid condition, injecting fuel into said bed at a plurality of locations spaced with respect to the direction of movement of the bed, injecting a combustion supporting gas into said bed in a manner to effectively support combustion of said fuel, burning the fuel so injected into the bed, conveying the moving bed over an evaporator immediately downstream of one of said locations, introducing water into and evaporating water to steam in said evaporator, conveying the moving bed over a superheater immediately downstream of another of said locations, passing steam from said evaporator through said superheater to superheat the same, independently controlling the rate of fuel injection at said one and said other location in a manner to independently control the generation of steam and the temperature of the superheated steam.

8. The method of operating a reheat boiler comprising continuously circulating a bed of discrete material which is an oxidizing catalyst through a predetermined path in a fluidized pseudo-liquid condition, injecting fuel into said bed at a plurality of locations spaced with respect to the direction of movement of the bed, injecting a combustion supporting gas into said bed in a manner to effectively support combustion of said fuel, burning the fuel so injected into the bed, conveying the moving bed over an evaporator immediately downstream of a first of said locations, introducing water into and evaporating water to steam in said evaporator, conveying the moving bed over a superheater immediately downstream of a second of said locations, passing steam from said evaporator through said superheater to superheat the same, conveying the moving bed over a reheater immediately downstream of a third location, passing superheated steam from said superheater through said reheater, after it has given up a portion of its energy, to reheat the same, independently controlling the rate of fuel injecting at said first, second and third locations in a manner to independently control the generation of steam and the temperature of the superheated and reheated steam.

9. The method of generating and superheating steam comprising continuously circulating a bed of discrete material which is an oxidizing catalyst through a predetermined path in a fluidized pseudo-liquid condition, maintaining said bed in said condition by injecting and burning fuel therein at a plurality of spaced locations with respect to the direction of movement of the bed and injecting combustion supporting gas therein to effectively support combustion of said fuel, releasing a substantial portion of the entraining gas from the bed at a predetermined point in said path, passing a liquid in indirect heat exchange relation with said bed at a location immediately upstream of said predetermined point thereby imparting heat thereto, passing the thus heated liquid in indirect heat exchange relation with said bed at a zone in the bed immediately downstream of one of said locations and thereat evaporating said liquid to a vapor, passing said vapor in indirect heat exchange relation with said bed at a zone in the bed immediately downstream of another of said locations relative to said predetermined point thereby superheating the same, and independently controlling the rate of fuel injection at the locations immediately upstream of the two zones in a manner to independently control the generation of vapor and the temperature of the superheated vapor.

10. The method defined in claim 9 including regulating the rate of circulation of the bed such that the temperature of the bed at the predetermined point is a desired value substantially less than that immediately upstream of said zones.

11. The method of generating and superheating steam comprising continuously circulating a bed of discrete material which is an oxidizing catalyst through a predetermined path in a fluidized pseudo-liquid condition, burning fuel in said bed at a plurality of locations by injecting fuel and air into said bed at said locations, conveying the moving bed over an evaporator immediately downstream of one of said locations, introducing water into and evaporating water to steam in said evaporator, conveying the moving bed over a superheater immediately downstream of another of said locations, passing steam from said evaporator through said superheater to superheat the same, independently controlling the rate of fuel and air injection at said one and said other location in a manner to independently control the generation of steam and the temperature of the superheated steam.

12. The method of generating and superheating steam comprising continuously circulating a bed of discrete material that is an oxidizing catalyst through a predetermined path in a fluidized pseudo-liquid condition, maintaining said bed in said condition by injecting and burning fuel therein at a plurality of spaced locations with respect to the direction of movement of the bed and injecting combustion supporting gas therein to effectively support combustion of said fuel, releasing a substantial portion of the entraining gas from the bed at a predetermined point in said path, conveying the moving bed over an evaporator immediately downstream of one of said locations, introducing water into and evaporating water to steam in said evaporator, conveying the moving bed over a superheater immediately downstream of another of said locations but upstream of said evaporator with respect to said predetermined point, passing steam from said evaporator through said superheater to superheat the same, and independently controlling the rate of fuel injection at said one and said other location in a manner to independently control the generation of steam and the temperature of the superheated steam.

13. The method of generating and superheating steam comprising continuously circulating a bed of discrete material that is an oxidizing catalyst through a predetermined path in a fluidized pseudo-liquid condition, maintaining said bed in said condition by injecting and burning fuel therein at a plurality of spaced locations with respect to the direction of movement of the bed and injecting combustion supporting gas therein to effectively support combustion of said fuel, releasing a substantial portion of the entraining gas from the bed at a predetermined point in the path, conveying the moving bed over an evaporator immediately downstream of one of said locations, introducing water into and evaporating water to steam in said evaporator, conveying the moving bed over a superheater immediately downstream of another of said locations, passing steam from said evaporator through said superheater to superheat the same, conveying the moving bed over an economizer located immediately upstream of said predetermined point, heating water in the economizer and conveying the heated water to the evaporator and independently controlling the rate of fuel injection at said one and said other location in a manner to independently control the generation of steam and the temperature of the superheated steam.

14. The method of generating and superheating steam comprising continuously circulating a bed of discrete material that is an oxidizing catalyst through a predetermined path in a fluidized pseudo-liquid condition, maintaining said bed in said condition by injecting and burning fuel therein at a plurality of spaced locations with respect to the direction of movement of the bed and injecting combustion supporting gas therein to effectively support combustion of said fuel, releasing a substantial portion of the entraining gas from the bed at a predetermined point in said predetermined path, passing said released gas in heat exchange relation with the combustion supporting gas to preheat the latter prior to its injection into the fluidized bed, conveying the moving bed over an evaporator immediately downstream of one of said locations, introducing water into and evaporating water to steam in said evaporator, conveying the moving bed over a superheater immediately downstream of another of said locations, said superheater being located upstream of said evaporator with respect to said predetermined point, passing steam from said evaporator through said superheater to superheat the same and independently controlling the rate of fuel injection at said one and said other location in a manner to independently control the generation of steam and the temperature of the superheated steam.

15. The method of generating and superheating steam comprising establishing a continuous gravity circulation of a fluidized pseudo-liquid mass of discrete material that is an oxidizing catalyst through a predetermined path including an upflow column laterally adjacent a downflow column and interconnected therewith at its extremities, introducing and burning fuel in said circulating mass at spaced locations in said predetermined path chosen so that the combustion gases thus generated will maintain said mass in a fluidized pseudo-liquid condition and the density of the fluidized mass in the upflow column less than the density of the fluidized mass in the downflow column, introducing a combustion supporting gas into said circulating bed in a manner to effectively support combustion of said fuel, flowing the fluidized mass over an evaporator immediately downstream of a first of said locations, introducing water into and evaporating water to steam in said evaporator, flowing the fluidized mass over a superheater immediately downstream of a second of said locations, conveying steam from said evaporator to said superheater and superheating the same therein, independently regulating the introduction and burning of fuel at said first and second locations, respectively, to independently control the generation of steam and the superheated steam temperature.

16. The method of generating and superheating steam comprising establishing a continuous gravity circulation of a fluidized pseudo-liquid mass of discrete material that is an oxidizing catalyst through a predetermined path including an upflow column laterally adjacent a downflow column and interconnected therewith at its extremities, introducing and burning fuel in said circulating mass at spaced locations in said predetermined path chosen so that the combustion gases thus generated will maintain said mass in a fluidized pseudo-liquid condition and the density of the fluidized mass in the upflow column less than the density of the fluidized mass in the downflow column, introducing a combustion supporting gas into said circulating bed in a manner to effectively support combustion of said fuel, releasing a substantial portion of the entraining combustion gases from said bed at the upper end of the upflow column, flowing the fluidized mass over an evaporator immediately downstream of a first of said locations, introducing water into and evaporating water to steam in said evaporator flowing the fluidized mass over a superheater immediately downstream of a second of said locations but upstream of said evaporator with respect to the zone of release of the combustion gases, conveying steam from said evaporator to said superheater and superheating the same therein, independently regulating the introduction and burning of fuel at said first and second locations, respectively, to independently control the generation of steam and the superheated steam temperature.

17. The method of generating and superheating steam comprising establishing a continuous gravity circulation of a fluidized pseudo-liquid mass of discrete material that is an oxidizing catalyst through a predetermined path including an upflow column laterally adjacent a downflow column and interconnected therewith at its extremities, introducing and burning fuel in said circulating mass at spaced locations in said predetermined path chosen so that the combustion gases thus generated will maintain said mass in a fluidized pseudo-liquid condition and the density of the fluidized mass in the upflow column less than the density of the fluidized mass in the downflow column, introducing a combustion supporting gas into said circulation bed in a manner to effectively support combustion in said fuel, releasing a substantial portion of the entraining combustion gases from said bed at the upper end of the upflow column, flowing the fluidized mass over an evaporator immediately downstream of a first of said locations, evaporating water to steam in said evaporator, flowing the fluidized mass over a superheater immediately downstream of a second of said locations, flowing said fluidized mass over an economizer at a location immediately upstream of the zone of release of the combustion gases and the evaporator, introducing water into and heating feed water in said economizer and conveying the same to the evaporator, conveying steam from said evaporator to said superheater and superheating the same therein, independently regulating the introduction and burning of fuel at said first and second locations, respectively, to independently control the generation of steam and the superheated steam temperature.

18. The method defined in claim 17 including regulating the rate of circulation of the bed such that the temperature of the bed at the predetermined point is at a desired value substantially less than that immediately upstream of the economizer.

19. The method of generating and superheating steam comprising establishing a continuous gravity circulation of a fluidized pseudo-liquid mass of discrete material that is an oxidizing catalyst through a predetermined path including an upflow column laterally adjacent a downflow column and interconnected therewith at its extremities, introducing and burning fuel in said circulating mass at spaced locations in said predetermined path chosen so that the combustion gases thus generated will maintain said mass in a fluidized pseudo-liquid condition and the density of the fluidized mass in the upflow column less than the density of the mass in the downflow column, introducing a combustion supporting gas into said circulating bed in a manner to effectively support combustion of said fuel, releasing a substantial portion of the entraining gases from said bed at the upper end of the upflow column, passing a liquid in indirect heat exchange relation said fluidized mass at a location immediately upstream of the release point of the combustion gases to heat the same, passing the thus heated liquid in indirect heat exchange relation with said bed at a zone in the mass immediately downstream of one of said locations and vaporizing the liquid, passing said vapor in indirect heat exchange relation with said fluidized mass at a zone in the mass immediately downstream of another of said locations but upstream of the aforementioned zone relative to the location of release of the combustion gases and thereby superheating said vapor, independently regulating the introduction and burning of fuel at the locations immediately upstream of the two zones to independently control the generation of steam and the superheated steam temperature.

20. The method defined by claim 19 including regulating the rate of circulation of the bed such that the temperature of the bed immediately downstream of each of said locations is substantially less than that immediately upstream.

21. A method of generating and superheating steam comprising establishing a continuous gravity circulation of a fluidized pseudo-liquid mass of discrete material that is an oxidizing catalyst through a predetermined path including an upflow column laterally adjacent a downflow column and interconnected therewith at its extremities, maintaining said mass in a fluidized pseudo-liquid condition and the fluidized mass in the upflow column at a lower density than that in the downflow column by generating combustion gases in and passing the same upwardly through the upflow column, injecting and burning fuel at vertically spaced locations in said upflow column to generate said combustion gases, injecting combustion supporting air into said fluidized mass in a manner to effectively support combustion of said fuel, releasing a substantial portion of said combustion gases at the upper end of said upflow column, the upflowing column serially traversing a superheater and an evaporator at respectively spaced locations each of which is substantially immediately downstream of a location of fuel injection, introducing water into and generating steam in said evaporator and conveying the same to and superheating the same in said superheater, independently regulating the rate of fuel injection at the latter locations to independently control steam generation and the temperature of the superheated steam.

22. A method of generating and superheating steam comprising establishing a continuous gravity circulation of a fluidized pseudo-liquid mass of discrete material that is an oxidizing catalyst through a predetermined path including an upflow column laterally adjacent a downflow column and interconnected therewith at its extremities, maintaining said mass in a fluidized pseudo-liquid condition and the fluidized mass in the upflow column at a lower density than that in the downflow column by generating combustion gases in and passing the same upwardly through the upflow column, injecting and burning fuel at vertically spaced locations in said upflow column to generate said combustion gases, injecting combustion supporting air into said fluidized mass in a manner to effectively support combustion of said fuel, releasing a substantial portion of said combustion gases at the upper end of said upflow column, passing the upflow column of fluidized material serially over a superheater and an evaporator at respectively spaced locations each of which is substantially immediately downstream of a location of fuel injection, thereafter passing the upflow column of fluidized material over an economizer, introducing and heating boiler feed water in said economizer and conveying the same to the evaporator, converting a substantial portion of said water to steam in said evaporator and conveying this steam to and superheating the same in said superheater, independently regulating the rate of fuel at the locations substantially immediately upstream of the superheater and evaporator to independently control the generation of steam and the temperature of the superheated steam.

23. A method of operating a reheat boiler comprising establishing a continuous gravity circulation of a fluidized pseudo-liquid mass of discrete material that is an oxidizing catalyst through a predetermined path including an upflow column laterally adjacent a downflow column and interconnected therewith at its extremities, maintaining said mass in a fluidized pseudo-liquid condition and the fluidized mass in the upflow column at a lower density than that in the downflow column by generating combustion gases in and passing the same upwardly through the upflow column, injecting and burning fuel at vertically spaced locations in said upflow column to generate said combustion gases, injecting combustion supporting air into said fluidized mass in a manner to effectively support combustion of said fuel, releasing a substantial portion of said combustion gases at the upper end of said upflow column, passing the upflow column of fluidized material over a superheater, a reheater and an evaporator, respectively, vertically spaced in said column at locations substantially immediately downstream of a location of fuel injection, introducing water into and generating steam in said evaporator, serially conveying the steam through the superheater and the reheater to raise the temperature of the same, independently regulating the rate of fuel injection at the locations substantially immediately upstream of the superheater, reheater and evaporator to independently control the generation of steam and the temperature of the superheated and reheated steam.

24. A method of generating and superheating steam comprising establishing a continuous gravity circulation of a fluidized pseudo-liquid mass of discrete material that is an oxidizing catalyst through a predetermined path including an upflow column laterally adjacent a downflow column and interconnected therewith at its extremities, maintaining said mass in a fluidized pseudo-liquid condition and the fluidized mass in the upflow column at a lower density than that in the downflow column by generating combustion gases in and passing the same upwardly through the upflow column, injecting and burning fuel at vertically spaced locations in said upflow leg to generate said combustion gases, injecting combustion supporting air into said fluidized mass at said locations, releasing a substantial portion of said combustion gases at the upper end of said upflow column, the upflow column serially traversing a superheater and an evaporator at respective spaced loactions each of which is substantially immediately downstream of a location of fuel injection, introducing water into and generating steam in said evaporator and conveying the same to and superheating the same in said superheater, independently regulating the rate of fuel and air injection at the latter location to independently control steam generation and the temperature of the superheated steam.

References Cited in the file of this patent
UNITED STATES PATENTS

| | | |
|---|---|---|
| 2,533,666 | Gunness | Dec. 12, 1950 |
| 2,635,952 | D'Ouville | Apr. 21, 1953 |
| 2,664,346 | Mayhew | Dec. 29, 1953 |
| 2,729,428 | Milmore | Jan. 3, 1956 |